(12) United States Patent
Nonoyama et al.

(10) Patent No.: US 9,205,796 B2
(45) Date of Patent: Dec. 8, 2015

(54) STEERING WHEEL AIRBAG COVER (71) Applicant: TOYODA GOSEI CO., LTD., Kiyosu-shi, Aichi-ken (JP)

(72) Inventors: Yoshinori Nonoyama, Kiyosu (JP); Hitoshi Iida, Kiyosu (JP); Yoshiteru Banno, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/473,048

(22) Filed: Aug. 29, 2014

(65) Prior Publication Data

US 2015/0091277 A1  Apr. 2, 2015

(30) Foreign Application Priority Data

Sep. 30, 2013  (JP) ................................. 2013-202913

(51) Int. Cl.
*B60R 21/215* (2011.01)
*B60R 21/203* (2006.01)
(52) U.S. Cl.
CPC ............. *B60R 21/215* (2013.01); *B60R 21/203* (2013.01); *B60R 2021/21543* (2013.01)
(58) Field of Classification Search
CPC ................ B60R 21/203; B60R 21/215; B60R 2021/21537; B60R 2021/21543
See application file for complete search history.

(56) References Cited

U.S. PATENT DOCUMENTS

| | | | |
|---|---|---|---|
| 6,626,458 B2* | 9/2003 | Fujita et al. ................. | 280/728.3 |
| 7,390,013 B2* | 6/2008 | Chavez et al. ............. | 280/728.3 |
| 7,766,381 B2* | 8/2010 | Fujimori et al. .............. | 280/731 |
| 7,988,189 B2* | 8/2011 | Hayashi et al. ............... | 280/731 |
| 8,651,680 B2* | 2/2014 | Rick ............................... | 362/84 |
| 2003/0209889 A1* | 11/2003 | Erwin et al. ................. | 280/728.3 |
| 2005/0079305 A1* | 4/2005 | Krappmann .................. | 428/35.7 |
| 2010/0201105 A1* | 8/2010 | Iwazato ....................... | 280/728.3 |
| 2013/0285355 A1* | 10/2013 | Muramatsu et al. ......... | 280/728.3 |

FOREIGN PATENT DOCUMENTS

JP  2003-327069 A  11/2003

* cited by examiner

*Primary Examiner* — Paul N Dickson
*Assistant Examiner* — Timothy Wilhelm
(74) *Attorney, Agent, or Firm* — Posz Law Group, PLC (57) ABSTRACT

An airbag cover includes a ceiling wall portion provided on a steering wheel, and covered an airbag. The ceiling wall portion has an attaching door portion and a non-attaching door portion opened to the left and the right, causing a predetermined fracture portion to facture by the inflating airbag. The attaching door portion has an ornament retained on an attaching seat. In the predetermined fracture portion, the common portion positioned at the center of the right and left door portions has a bypass portion on the circumference of the attaching seat. The attaching door portion is slightly opened toward the rear.

3 Claims, 9 Drawing Sheets

STEERING WHEEL AIRBAG COVER

The present application claims priority from Japanese Patent Application No. 2013-202913 of Nonoyama et al., filed on Sep. 30, 2013, the disclosure of which is hereby incorporated into the present application by reference.

BACKGROUND OF THE INVENTION

1. Field of the Invention

The present invention relates to an airbag cover that is provided in a steering wheel mounted on a vehicle. The airbag cover is provided on an upper surface of a boss portion in the vicinity of the center of the steering wheel, and covers an airbag accommodated in the boss portion.

2. Description of Related Art

In the related art, in the airbag cover disclosed in JP-A-2003-327069, an ornament is provided on an upper surface in the vicinity of the center of a ceiling wall portion that covers an airbag. The ceiling wall, portion of the airbag cover is provided with right and left door portions that are opened to the right and the left, respectively. A predetermined fracture portion (a tearable portion) is provided in circumferential edges of the right and the left door portions so as to fracture when the airbag inflates. The predetermined fracture portion is disposed in a front edge, a rear edge, and a center edge approaching the front and the rear edges in the circumferential edges of the right and the left door portions. The ornament is retained on an attaching seat that is provided in any one of the right and the left door portions, for example, in the left door portion. The predetermined fracture portion includes a common portion that is disposed in the center edge approaching the right and the left door portions. The common portion has a bypass portion that goes around half of the circumference of the attaching seat. The predetermined fracture portion has a bilaterally symmetrical shape in the circumferential edges of the right and the left door portions except for in the vicinity of the bypass portion of the common portion.

When the right and the left door portions are pushed and opened by the inflating airbag, the right and the left door portions are opened in a bilaterally symmetrical manner to the right and the left, respectively. The configuration of the airbag cover, by which the airbag pushes and opens the right and the left door portions to the right and the left, respectively, is referred to as a hinged double door airbag cover. In the hinged double door airbag cover, for example, when the door portions are opened, the right and the left door portions quickly move and separate from the vicinity of the center of the face of a driver to the right and the left, respectively, even when the ornament is retained by the left do or portion. For this reason, in the hinged double door airbag cover, even when the face of the driver approaches a boss portion, it is possible to reduce a period of contact between the ornament and the face of the driver, and it is possible to smoothly open the door portions.

SUMMARY OF THE INVENTION

However, in a steering wheel, an operation switch of an audio device or a trip meter may be provided on right and left spoke portions connecting a ring portion that the driver grips when steering, and the boss portion. In this configuration, when an airbag pushes and opens the left door portion to which the ornament is attached, the ornament comes into contact with an operation unit (an operation button) of the operation switch. The operation unit, or the ornament is damaged. A bezel may also be provided in the spoke portion in addition to the operation switch. That is, in the airbag cover of the related art, there is a problem in that the ornament comes into contact with a spoke mounting component such as the operation, switch or the bezel, thereby causing damage to the spoke mounting component.

The present invention is intended to solve the above-mentioned problem. An object of the present invention is to provide a steering wheel airbag cover that can prevent an ornament from corning into contact with a spoke mounting component, thereby preventing damage to the spoke mounting component, even when the ornament is retained by any one of right and left door portions.

A steering wheel airbag cover of the present invention is provided on an upper surface of a boss portion in the vicinity of the center of a steering wheel. The steering wheel accommodates an airbag in the boss portion. The airbag cover of the present invention includes a ceiling wall portion that covers the accommodated airbag. The ceiling wall portion is provided with right and left door portions that are opened to the right and the left, respectively, when the airbag inflates. An attaching seat is provided in any one of the right and left door portions in the vicinity of the center of the ceiling wall portion. Furthermore, an attaching seat is retained on an upper surface in the vicinity of the center of the ceiling wall portion, and an ornament is provided on the attaching seat. The ceiling wall portion is provided with a predetermined fracture portion that fractures when the airbag inflates. The predetermined fracture portion is disposed in a front edge, a rear edge, and a center edge approaching the front and rear edges of a circumferential edge of each of the right and left door portions. The predetermined fracture portion has the center edge between the right and left door portions as a common portion. The common portion is provided with a bypass portion that goes around half of the circumference of the attaching seat. One of the right and left door portions, retaining the ornament, becomes an attaching door portion. The other of the right and left door portions, to which the ornament is not attached, becomes a non-attaching door portion. When seen from above, the attaching door portion is opened in such a manner that the common portion is positioned farther toward the rear than in a lateral direction compared to the non-attaching door portion.

In the airbag cove of the present invention, when the attaching door portion is pushed and opened by the airbag, the attaching door portion is opened in such a manner that the common portion retaining the ornament, in other words, the vicinity of the attaching seat is positioned farther toward the rear than in the lateral direction compared to the non-attaching door portion. For this reason, the ornament rotating along with the opening of the attaching door portion rotates being offset farther to the rear than a mounting spot of the spoke mounting component such as an operation switch or a bezel. As a result, the ornament is prevented from corning into contact with the spoke mounting component, thereby preventing damage to the spoke mounting component.

From the perspective of operability or design, the spoke mounting component such as an operation unit of the operation switch is mounted on a front spoke portion which extends from a front edge of the boss portion to the right or the left. When the attaching door portion is opened farther toward the rear than in the lateral direction, the vicinity of the attaching seat, on which the ornament is provided, is unlikely to overlap an upper surface of the front spoke portion. For this reason, the ornament does not come into contact with the spoke mounting component provided on the upper surface of the front spoke portion, thereby preventing damage to the spoke mounting component. That is, the ornament does not come into contact with an avoidance object of the spoke mounting component, thereby preventing damage to the avoidance object. The avoidance object may be damaged when the ornament comes into contact with the avoidance object, accompanied by a strong pushing pressure.

Accordingly, the steering wheel airbag cover of the present invention can prevent the ornament from coming into contact with the spoke mounting component, thereby preventing damage to the spoke mounting component, even when the ornament is retained by any one of right and left door portions.

The steering wheel airbag cover according to the embodiment of the present invention can also prevent damage to the ornament itself.

The amount by which the opening attaching door portion is offset to the rear is preferably set to be high in such a manner that, the ornament is satisfactorily offset from the avoidance object to the rear. However, the amount of offset may be set to be small, when the ornament is brought into contact with the avoidance object by a pushing pressure, a magnitude of which is not large enough to damage the avoidance object. That is, it is preferred that the amount of offset be appropriately set based on rigidity of the avoidance object and the kinetic energy of the ornament.

The steering wheel airbag cover of the present invention may have the following configuration. The predetermined fracture portion includes an attaching front portion of the front edge, an attaching rear portion of the rear edge, and the common portion in a circumferential, edge of the attaching door portion. The predetermined fracture portion includes a non-attaching front portion of the front edge, a non-attaching rear portion of the rear edge, and the common portion in a circumferential edge of the non-attaching door portion. The attaching door portion has a portion between end portions separated from the common portion of the attaching front portion and the attaching rear portion provided as an attaching hinge portion when the door portions are opened. The non-attaching door portion has a portion between end portions separated from the common portion of the non-attaching front portion and the non-attaching rear portion provided as a non-attaching hinge portion when the door portions are opened. When seen from above, the attaching hinge portion has substantially the same length dimension as that of the non-attaching hinge portion. In the predetermined fracture portion, the end portion separated from the common portion of the attaching front portion bends and extends farther to the rear than the end portion separated from the common portion of the non-attaching front portion.

In this configuration, the end portion of the attaching front portion of the circumferential edge of the attaching door portion extends farther to the rear than the end portion of the non-attaching front portion of the non-attaching door portion, and thus the attaching door portion has a fracture distance longer than that of the non-attaching door portion. However, when the attaching and non-attaching door portions are opened, the respective hinge portions of the attaching and non-attaching door portions have substantially the same length. For this reason, when the airbag inflates, it is possible to ensure the strength of the respective hinge portions of the attaching and non-attaching door portions, and it is possible to stably open the attaching and non-attaching door portions to the left and the right, respectively. As a result, the attaching and non-attaching door portions can allow the smooth protrusion of the airbag.

At this time, in the steering wheel airbag cover of the present invention, a farthest end of the attaching rear portion in the predetermined fracture portion is separated straightly from the common portion. The non-attaching rear portion in the predetermined fracture portion extends straightly from, the common portion, and has a bending portion, a farthest end of which bends to the front.

In this configuration, the farthest end of the end portion of the attaching rear portion of the predetermined fracture portion on the circumference of the attaching door portion simply extends straight to the outside. That is, unlike the end portion of the non-attaching rear portion of the non-attaching door portion, the bending portion bending to the front is not provided in the circumferential edge of the attaching door portion. For this reason, it is possible to dispose the hinge portion in the rearmost end while ensuring a large opening area when the attaching door portion is opened. In other words, first, the attaching door portion is one of the hinged double door portions, each of which is opened to the right or the left. That is, the attaching door portion can reduce a period of contact between the face of a driver and the ornament. It is possible to open, the attaching door portion farthest toward the rear without reducing an opening area of when the attaching door portion is opened. For this reason, in the attaching door portion having this configuration, the ornament is less likely to come into contact with the spoke mounting component provided on the upper surface of the front spoke portion, thereby preventing damage to the spoke mounting component. As a result, it is possible to prevent the ornament from damaging the spoke mounting component. It is also possible to prevent damage to the ornament itself.

DETAILED DESCRIPTION OF THE INVENTION

A preferred embodiment of the present invention is described below with reference to the accompanying drawings. However, the invention is not limited to the embodiment disclosed herein. All modifications within the appended claims and equivalents relative thereto are intended to be encompassed in the scope of the claims.

Figure 1:
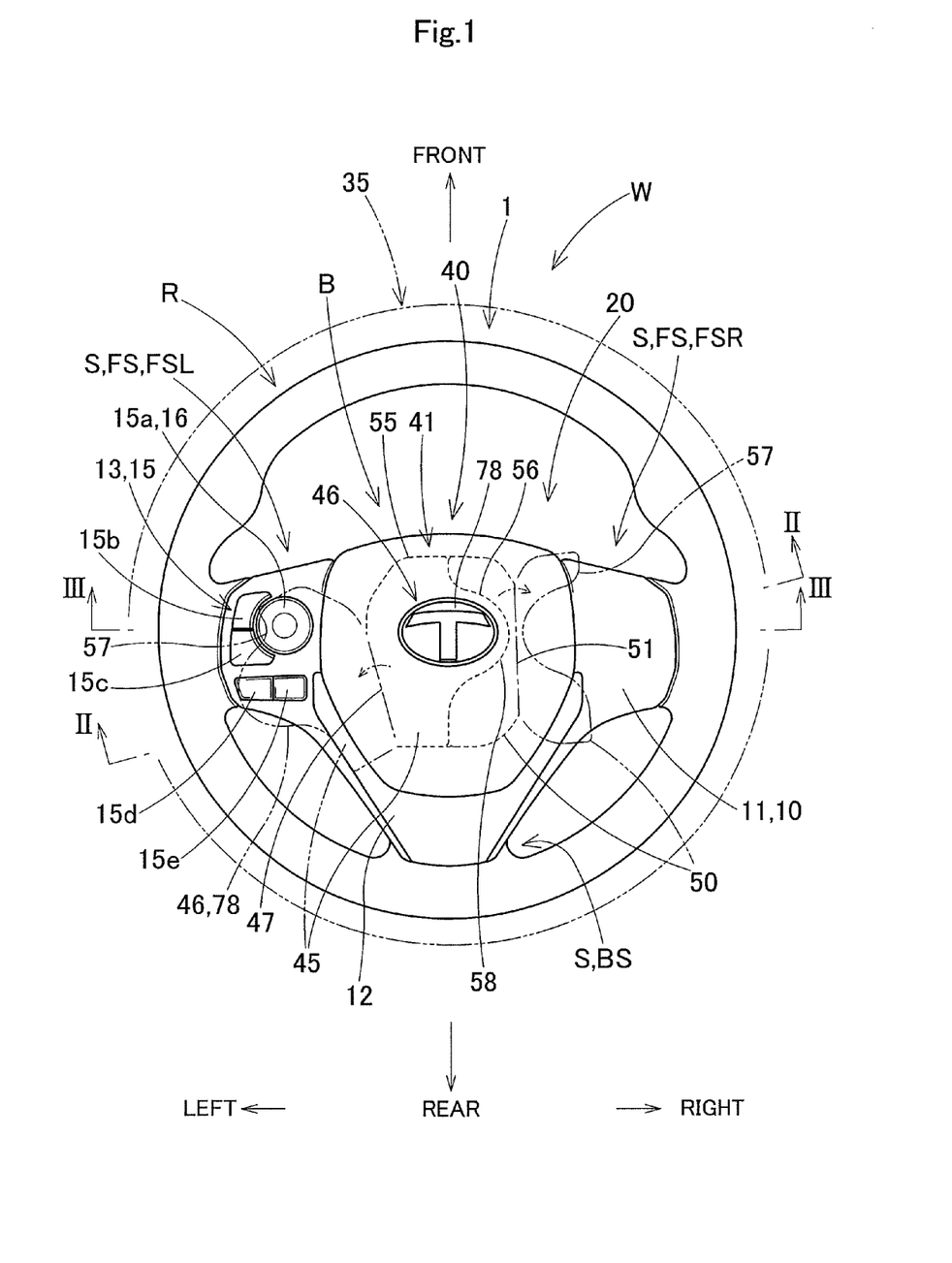
FIG. 1 is a plan view of a steering wheel according to an embodiment of the present invention.

As illustrated in FIG. 1, a steering wheel W according to an embodiment includes a steering wheel main body 1 and an airbag apparatus 20. The steering wheel main body 1 includes a ring portion R, a boss portion B, and a spoke portion S. The ring portion R is a portion that a driver grips, when steering.

The boss portion B is disposed at the center of the ring portion R. The spoke portion S is a portion connecting the ring portion R and the boss portion B. The airbag apparatus 20 is provided in the boss portion B.

In the specification, a vertical direction, a lateral direction, and a longitudinal direction are defined based on when the driver steers the vehicle straightforward. A steering shaft SS (refer to FIG. 3) is connected to the steering wheel W by using a nut SN. The vertical direction corresponds to a vertical, direction along an axial direction of the steering shaft SS when the vehicle is steered straightforward (refer to FIGS. 2 and 3). The lateral direction corresponds to a lateral direction of the vehicle, being orthogonal to the axis of the steering shaft SS (refer to FIGS. 1 and 3). The longitudinal direction corresponds to a longitudinal direction of the vehicle, being orthogonal to the axis of the steering shaft (refer to FIG. 1).

Figure 2:
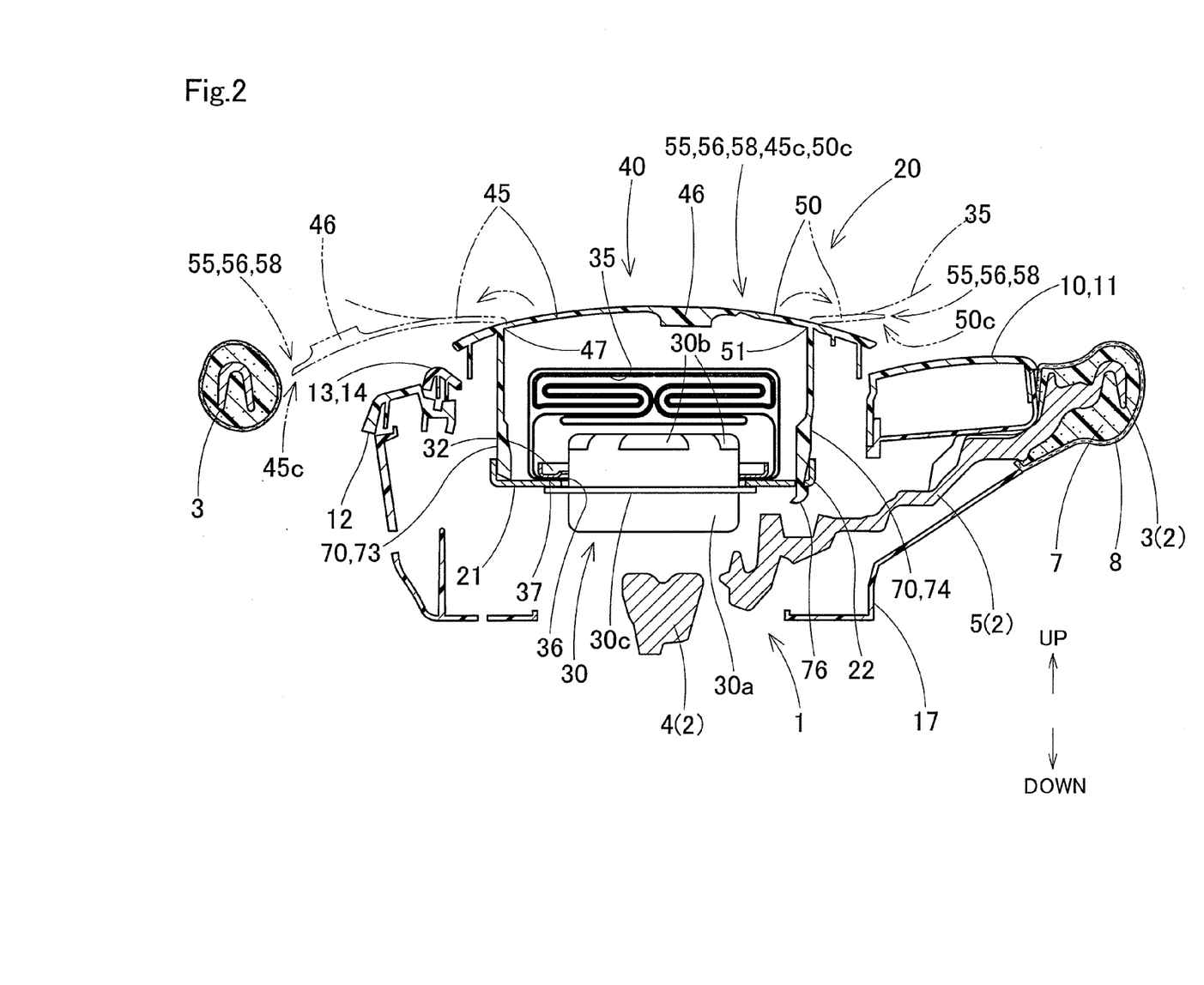
FIG. 2 is a vertical cross sectional view of the steering wheel according to the embodiment illustrated in FIG. 1, and corresponds to a view taken along line II-II in FIG. 1.
Figure 3:
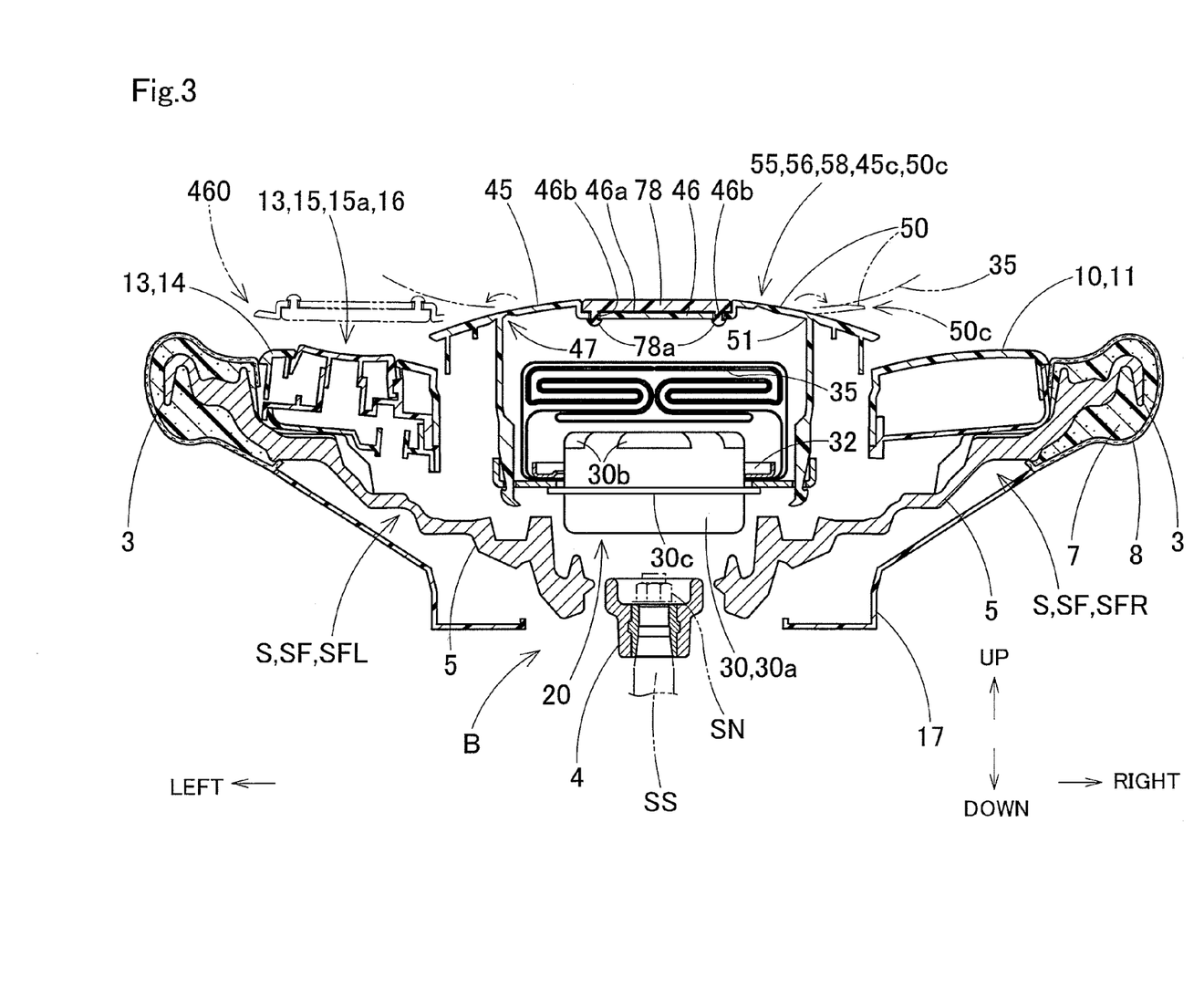
FIG. 3 is a vertical cross sectional view of the steering wheel according to the embodiment illustrated in FIG. 1, and corresponds to a view taken along line III-III in FIG. 1.

As illustrated in FIGS. 1 to 3, the steering wheel main body 1 includes a core metal 2 and an enveloping layer 7. The core metal 2 is provided so as to connect the ring portion R, the boss portion B, and the spoke portion S. The enveloping layer 7 is made of urethane or the like. The enveloping layer 7 covers the core metal 2 of the ring portion R, and the core metal 2 of the spoke portion S in the vicinity of the ring portion R. An outer surface of the enveloping layer 7 is wound by leather 8. The spoke portion S is configured to include two types of spoke portions such as a front spoke portion FS (FSL and FSR) and a rear spoke portion BS. The front spoke portion FS (FSL and FSR) extends to the right and the left from a front edge of the boss portion B. The rear spoke portion BS extends to the rear from the boss portion 3.

Ornamental synthetic resin-made bezels 11, 12, and 14 are provided on the circumference of the airbag apparatus 20. Furthermore, an operation unit (an operation button) 15 for a predetermined operation switch is provided in the bezel 14 of the front left spoke portion FSL. Specifically, in the embodiment, the operation unit 15 includes an operation unit 15a for the determination of an operation or a movement mode of a radio, a compact, disk player, a television, and the like; a switching operation unit 15b; a playback operation unit 15c; and volume control operation units 15d and 15e.

The operation unit 15, and the bezels 11, 12, and 14 form spoke mounting components 10 and 13 which are respectively provided in the front right spoke portion FSR and the front left spoke portion FSL. The spoke mounting components 10 and 13 are made of rigid synthetic resin such as PP or ABS resin having high shape retention. In the embodiment, the operation unit 15a of the spoke mounting component 13 provided on the front left spoke portion FSL is prevented from coming into contact with an ornament 78 and from being damaged when door portions of an airbag cover are opened. That is, the operation unit 15a is an avoidance object 16 that is protected from damage by the ornament 78.

The steering wheel main body 1 has a lower cover 17 provided on a lower surface of the boss portion B.

As illustrated in FIGS. 2 and 3, the airbag apparatus 20 includes an airbag 35 that is caused to inflate by an inflow of inflation gas; an inflator 30; an airbag cover 40; an attaching base 21, and a retainer 32. The inflator 30 supplies the inflation gas into the airbag 35. The airbag cover 40 is made of synthetic resin, and covers the folded airbag 35. The attaching base 21 is made of a metal plate, and retains the airbag 35, the inflator 30, and the airbag cover 40.

The completely inflated airbag 35 has a thick substantially disc shape, being close to a spherical shape. The airbag 35 includes a round opening 36 in a lower portion. A circumferential edge of the opening 36 functions as an attaching seat 37.

The inflator 30 includes a columnar main body 30a. A plurality of gas discharge ports 30b are provided in an upper portion of the main body 30a so as to allow the inflation gas to be discharged. A rectangular annular flange portion 30c (refer to FIG. 5) is provided in a protruding manner on an outer circumferential surface of the main body 30a.

The retainer 32 is made of a rectangular annular metal plate, and bolts 32b (refer to FIG. 5) are provided in a protruding manner at four corners of the retainer 32. The retainer 32 is provided in the airbag 35 except for the bolt 32b. Each bolt 32b protrudes to the outside from the airbag 35. That is, the bolts 32b pass through the corresponding attaching seats 37 of the airbag 35, the attaching base 21, and the flange portion 30c of the inflator 30 sequentially. When the bolt 32b is tightened with a nut 33, the airbag 35 and the inflator 30 are attached to the attaching base 21 by the retainer 32 and the nut 33.

Figure 5:
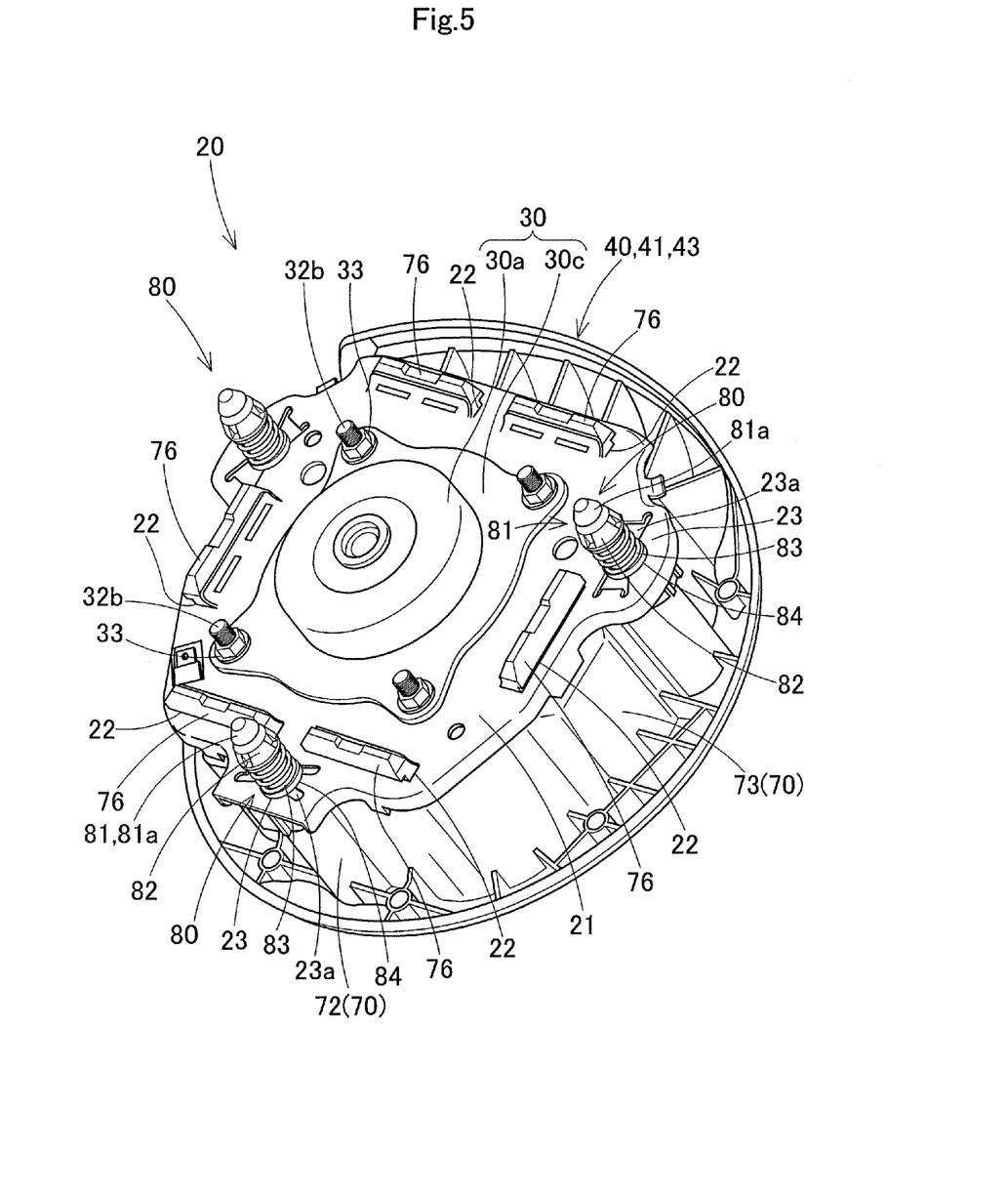
FIG. 5 is a perspective view of the airbag apparatus of the steering wheel according to the embodiment illustrated in FIG. 1 when seen from a bottom surface.

As illustrated in FIGS. 2, 3, and 5, the attaching base 21 retains the airbag 35, the inflator 30, and the airbag cover 40 of the airbag apparatus 20. The airbag apparatus 20 is attached to the steering wheel main body 1 via the attaching base 21 by using an assembly portion 80. The attaching base 21 includes a plurality of locking portions 22 into which attaching leg portions 76 of the airbag cover 40 are locked. Assembly base portions 23 for the attachment of the assembly portion 80 are provided on right, left, and rear sides of the attaching base 21. Attachment holes 23a are provided in the assembly base portions 23.

Each assembly portion 80 includes a metal assembly pin 81; a synthetic resin-made cover portion 82; a coil spring 83; and a synthetic resin-made insulation spacer 84. A locking head portion 81a is provided in a lower end of the assembly pin 81. The assembly portion 80 is attached into the attachment hole 23a so as to protrude downwardly, passing through a lower surface from an upper surface of the attaching base 21. When the locking head, portion 81a of the assembly pin 81 is inserted and locked into a predetermined assembly seat of the steering wheel main body 1, the airbag apparatus 20 is attached to the steering wheel main body 1.

A predetermined horn switch mechanism is provided in a region in which the assembly portion 80 is positioned on the upper surface of the attaching base 21. The horn switch mechanism includes the coil spring 83; a movable contact point (not illustrated) on the upper surface of the attaching base 21; and a fixed contact point (not illustrated) in an upper end of the assembly pin 81, the upper end protruding upwardly from the attaching base 21. In the horn switch mechanism, the airbag cover 40 is pushed down against a biasing force of the coil spring 83 along with the airbag apparatus 20, the movable contact point (not illustrated) comes into contact with the fixed, contact point (not illustrated), and thus a horn switch can be turned on. After the push-down operation of the airbag cover 40, the biasing force of the coil spring 83 returns the airbag cover 40 to its original position along with the airbag apparatus 20.

As illustrated in FIGS. 1 to 4, the airbag cover 40 is made of synthetic resin such as an olefin-based thermoplastic elastomer. The airbag cover 40 is provided on the upper surface of the boss portion B in the vicinity of the center of the steering wheel W. The airbag cover 40 includes a ceiling wall portion 41 and a side wall portion 70. The ceiling wall portion 41 covers an upper side of the airbag 35 that is accommodated in the boss portion B. The side wall portion 70 extends from a lower surface of the ceiling wall portion 41 so as to have a substantially rectangular cylinder shape, and covers the entire outer circumference of the accommodated airbag 35.

Figure 6:
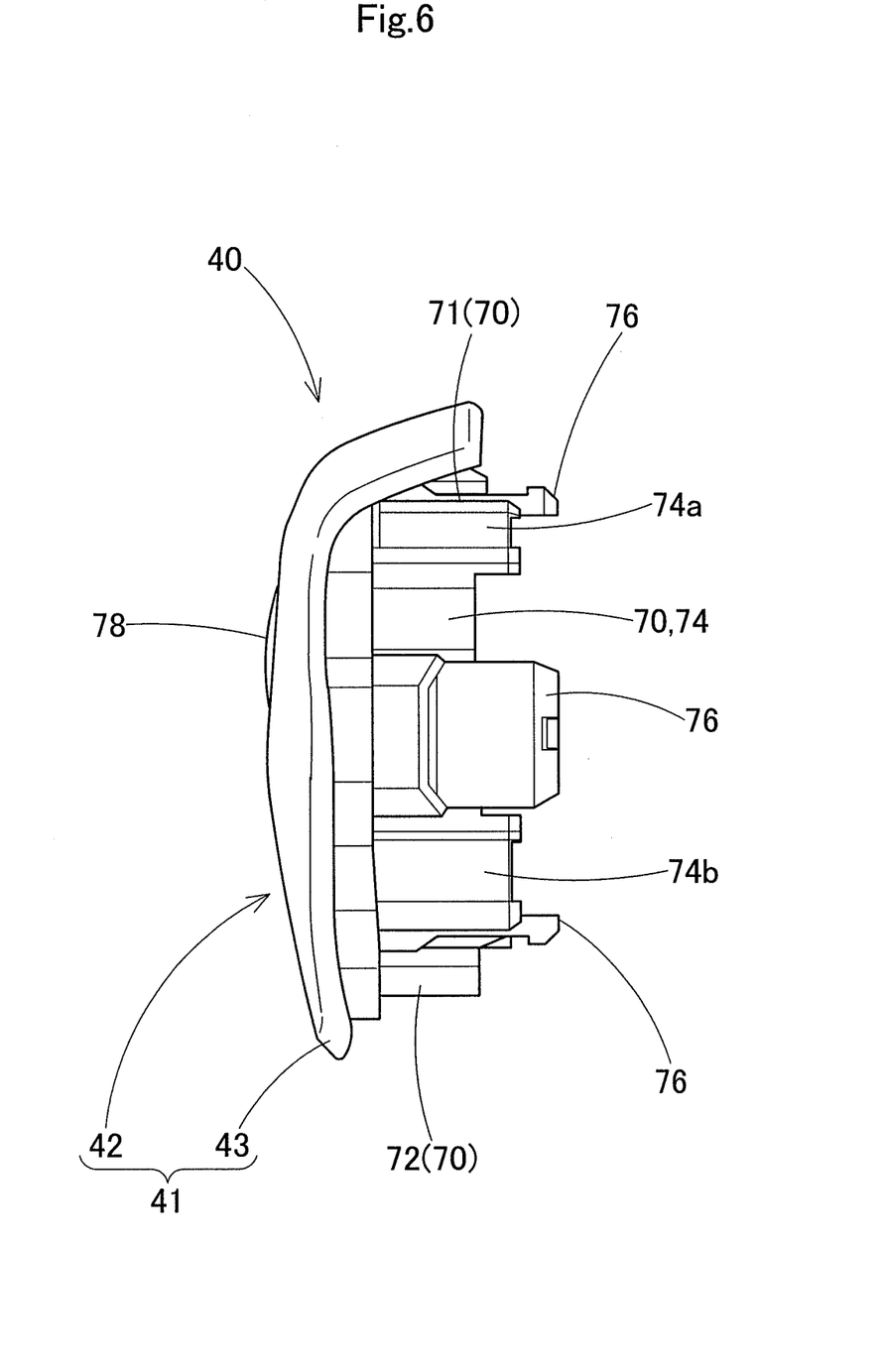
FIG. 6 is a side view of an airbag cover according to the embodiment illustrated in FIG. 1.
Figure 7:
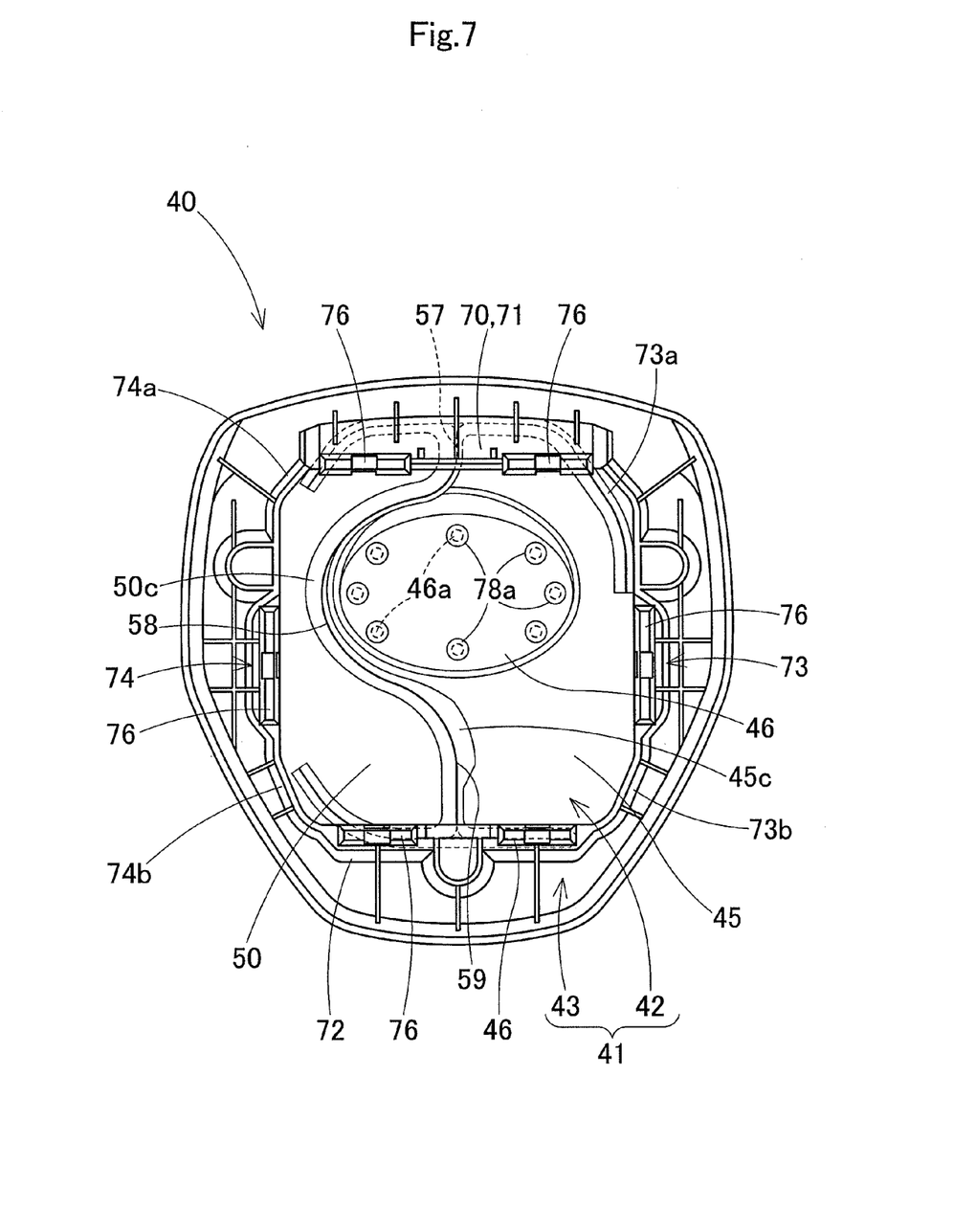
FIG. 7 is a bottom view of the airbag cover according to the embodiment illustrated in FIG. 1.

As illustrated in FIGS. 5 to 7, the side wall portion 70 includes a front wall portion 71; a rear wall portion 72; a left wall portion 73; and a right wall portion 74. The left wall portion 73 is connected to the front wall portion 71 and the rear wall portion 72 via a bent front edge portion 73a and a bent rear edge portion 73b. The right wall portion 74 is connected to the front wall portion 71 and the rear wall portion 72 via a bent front edge portion 74a and a bent rear edge portion 74b. The side wall portion 70 has the attaching leg portion 76 provided in a lower end thereof, and has a bilaterally symmetrical shape. The attaching leg portion 76 is inserted and locked into the locking portion 22 of the attaching base 21.

The ceiling wall portion 41 includes an opening area 42 and a circumferential edge area 43. The opening area 42 is an area on an inner side of the side wall portion 70, and is opened when the airbag 35 inflates. The circumferential edge area 43 is an area on an outer side of the side wall portion 70.

As illustrated in FIGS. 1 to 4, 7, and 8, a left door portion 45 and a right door portion 50 are provided in the opening area 42. When the airbag 35 inflates, the left door portion 45 and the right door portion 50 are respectively opened to the left and the right, fracturing a predetermined fracture portion 55. The predetermined fracture portion 55 is disposed, in a front edge 45a, a rear edge 45b, and a center edge 45c, which approaches the front edge 45a and the rear edge 45b, of a circumferential edge of the left door portion 45. In addition, the predetermined fracture portion 55 is disposed in a front edge 50a, a rear edge 50b, and a center edge 50c, which approaches the front edge 50a and the rear edge 50b, of a circumferential edge of the right door portion 50.

The elliptical plate-shaped ornament 78 is provided in the vicinity of the center of the opening area 42 of the ceiling wall portion 41. The ornament 78 is made of rigid synthetic resin such as PP having high shape retention, or metal. The ornament 78 includes a plurality of attaching legs 78a which protrude from a lower surface of the ornament 78. The ornament 78 may be provided in the ceiling wall portion 41 by adhesion, welding, or insert molding.

An attaching seat 46 for the attachment of the ornament 78 is formed in the left door portion 45. The attaching seat 46 has a substantially semicircular shape in which the ornament 78 is bilaterally divided. The attaching seat 46 protrudes so as to enter a region of the right door portion 50. A concave portion 46a is provided in an upper surface of the attaching seat 46 so as to accommodate the ornament 78. The attaching seat 46 includes an attaching hole 46b into which the attaching leg 78a of the ornament 78 is inserted. The attaching leg 78a is inserted into the attaching hole 46b, and the ornament 78 is attached to the attaching seat 46. The diameter of the tip of the attaching leg 78a is enlarged by heat caulking, or the tip of the attaching leg 78a is bent in such a manner that the attaching leg portion 76 is not pulled out of the attaching hole 46b.

The predetermined fracture portion 55 has a thickness less than that of other portions of the airbag cover 40. In the embodiment, a concave portion is provided on a lower surface of the predetermined fracture portion 55. The respective center edges 45c and 50c of the left door portion 45 and the right door portion 50 become a common portion 56. The common portion 56 includes a bypass portion 58 that goes around half of the circumference of the attaching seat 46. That is, the bypass portion 58 goes around so as to surround a circumferential edge of the attaching seat 46 that protrudes so as to enter the region of the right door portion 50. The common portion 56 includes a front common portion 57 and a rear common portion 59 in addition to the bypass portion 58. The front common portion 57 is positioned on a front side of the bypass portion 58, and extends to the outside (to the front) in a substantially straight line along the longitudinal direction. The rear common portion 59 is positioned on a rear-side of the bypass portion 58, and extends to the outside (to the rear) in a substantially straight line along the longitudinal direction.

In the opening area 42 of the ceiling wall portion 41, each the left door portion 45 and the right door portion 50 has a uniform thickness except for in the vicinity of the attaching seat 46 or a region of the predetermined fracture portion 55. In the embodiment, each of hinge portions 47 and 51 also has a uniform thickness similar to other portions of the opening area 42.

In the airbag cover 40, the left door portion 45 becomes an attaching door portion that retains the ornament 78. The right door portion 50 becomes a non-attaching door portion, to which the ornament 78 is not attached. When the left door portion 45 and the right door portion 50 are pushed and opened by the inflating airbag 35, the left door portion 45 and the right door portion 50 are opened as follows. That is, when seen from above, the left door portion (the attaching door portion) 45 is opened in such a manner that the vicinity of the bypass portion 58 of the common portion 56 is positioned farther toward the rear than in the lateral direction compared to the right door portion (the non-attaching door portion) 50.

Figure 4:
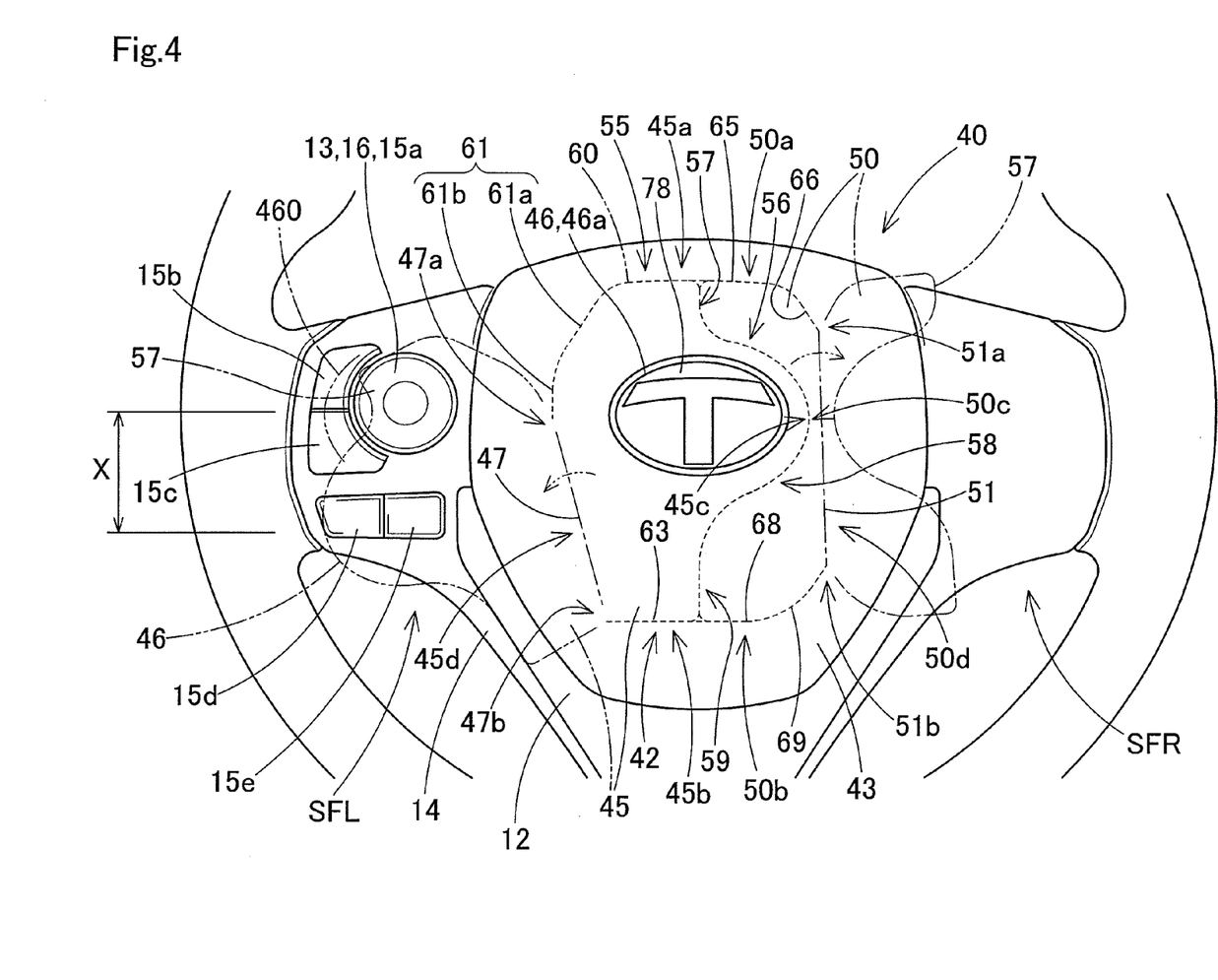
FIG. 4 is a plan view of enlarging the vicinity of an airbag apparatus of the steering wheel according to the embodiment illustrated in FIG. 1.
Figure 8:
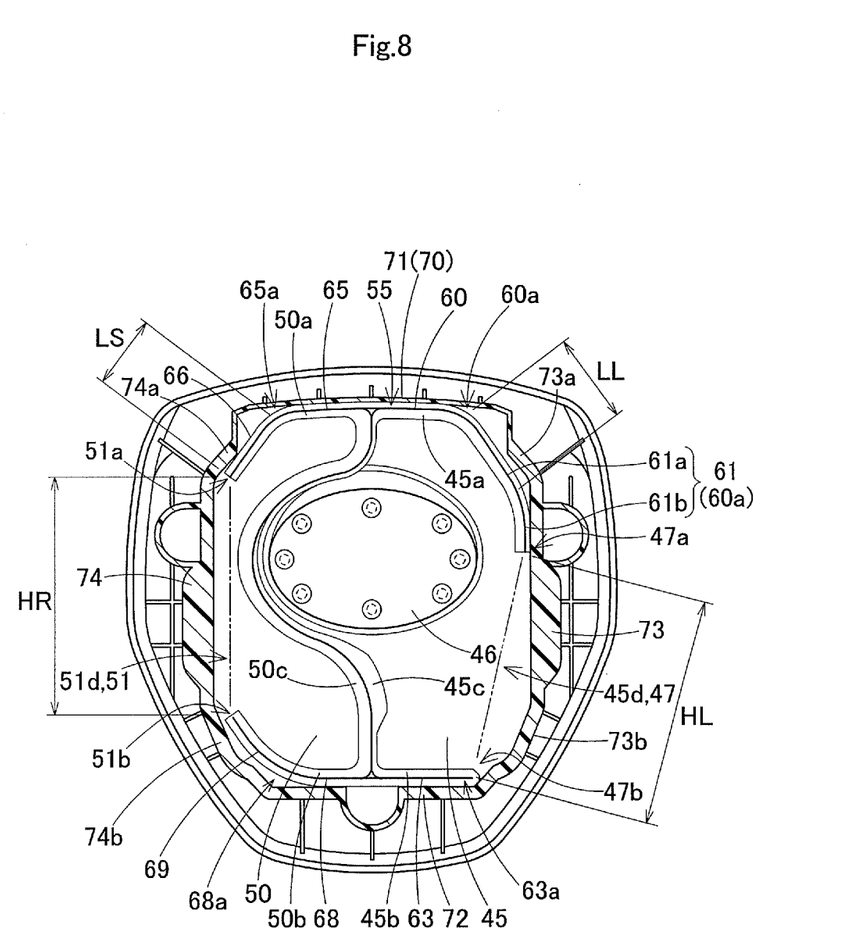
FIG. 8 is a fractional bottom view of a part of the airbag cover according to the embodiment illustrated in FIG. 1.
Figure 9:
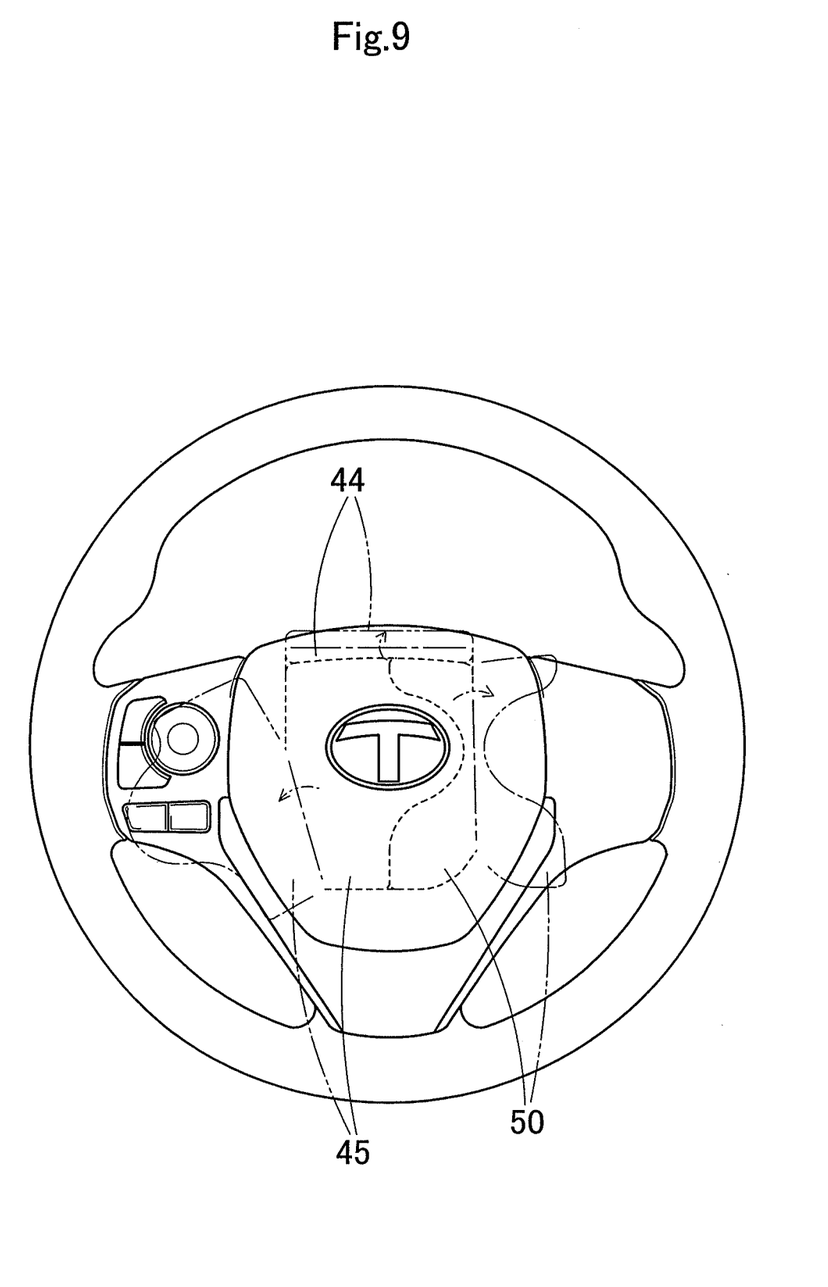
FIG. 9 is a plan view of the steering wheel having the airbag cover of a modification example according to the embodiment.

Specifically, in the predetermined fracture portion 55, as illustrated in FIGS. 4 and 8, an attaching front portion 60 of the front edge 45a, an attaching rear portion 63 of the rear edge 45b, and the common portion 56 are provided in the circumferential edge of the left door portion (the attaching door portion) 45. The attaching front portion 60 and the attaching rear portion 63 of the left door portion 45 includes end portions 60a and 63a separated from the common portion 56, respectively, in a left edge 45d of the left door portion 45. The left door portion 45 has a portion between the end portions 60a and 63a as an attaching hinge portion 47, when being opened. When the attaching hinge portion 47 is seen from above, the attaching hinge portion 47 has a straight-line shape. A rear end 47b of the attaching hinge portion 47 is disposed farther on a center side in the lateral direction than a front end 47a thereof.

In the predetermined fracture portion 55, a non-attaching front portion 65 of the front edge 50a, a non-attaching rear portion 68 of the rear edge 50b, and the common portion 56 are provided in the circumferential edge of the right door portion (the non-attaching door portion) 50. The non-attaching front portion 65 and the non-attaching rear portion 68 of the right door portion 50 includes end portions 65a and 68a separated from the common portion 56, respectively, at a right edge 50d of the right door portion 50. The right door portion 50 has a portion between, the end portions 65a and 68a as an attaching hinge portion 51, when being opened. When the non-attaching hinge portion 51 is seen from above, the non-attaching hinge portion 51 has a straight-line shape along the longitudinal direction. That is, the non-attaching hinge portion 51 is disposed in such a manner that a front end 51a and a rear end 51b of the non-attaching hinge portion 51 are positioned along the longitudinal direction.

In the embodiment, when seen from above, the attaching hinge portion 47 and the non-attaching hinge portion 51 have length dimensions KL and KR, respectively, which are substantially the same (refer to FIG. 8).

Furthermore, the end portion 60a of the attaching front portion 60, being separated from the common portion 56 is provided so as to bend and extend farther to the rear than the end portion 65a of the non-attaching front portion 65, being separated from the common portion 56. That is, the end portion 65a of the non-attaching front portion 65 is provided with a bending portion 66 that bends to the outside in the lateral direction, and is connected to the hinge portion 51. In contrast, the end portion 60*a* of the attaching front portion 60 includes a farthest bending end portion 61. The farthest bending end portion 61 includes a bending portion 61*a* and a running portion 61*b*. The bending portion 61*a* bends to the outside in the lateral direction, and extends farther to the rear than the bending portion 66. That is, the bending portion 61*a* has a length dimension LL longer than a length dimension LS of the bending portion 66. The running portion 61*b* is provided between the bending portion 61*a* and the hinge portion 47 along the longitudinal direction.

In the embodiment, a farthest end of the end portion 63*a* of the attaching rear portion 63 is separated from the common portion 56 straightly along the lateral direction. In contrast, the non-attaching rear portion 68 not only extends from the common portion 56 straightly along the lateral direction, but also has the bending portion 69, a farthest end of which bends to the front.

The attaching front portion 60 including the farthest bending end portion 61, and the attaching rear portion 63 are provided so as to approach an inner side of the side wall portion 70 in the ceiling wall portion 41, that is, inner sides of the front wall portion 71, the rear wall portion 72, the left wall portion 73, and the right wall portion 74. In addition, the non-attaching front portion 65 and the non-attaching rear portion 68 including the respective bending portions 66 and 69 are provided so as to approach an inner side of the side wall portion 70 in the ceiling wall portion 41, that is, inner sides of the front wall portion 71, the rear wall portion 72, the left wall portion 73, and the right wall portion 74. For this reason, the airbag cover 40 can ensure a large opening area when the left door portion 45 and the right door portion 50 are opened.

First, resin part of the airbag cover 40 except for the ornament 78 is formed by using die molding such as injection molding. Thereafter, it is possible to manufacture the airbag cover 40 by attaching the ornament 78 to the attaching seat 46.

First, the assembly of the airbag apparatus 20 is performed by putting the retainer 32 into the airbag 35, and by setting each bolt 32*b* to protrude from the airbag 35. The airbag 35 is folded. Subsequently, the folded airbag 35 and the inflator 30 are attached to the attaching base 21 by using the bolt 32*b* and the nut 33. Furthermore, the assembly portions 80 are assembled with the corresponding assembly base portions 23 of the attaching base 21. It is possible to assemble the airbag apparatus 20 by inserting and locking the attaching leg portions 76 into the corresponding locking portions 22.

Thereafter, the steering wheel, main body 1 is attached to the steering shaft SS of the vehicle by using the nut SN. The assembly portions 80 are correspondingly inserted and locked into the predetermined assembly seats of the steering wheel main body 1 while lead wires of a predetermined airbag operation circuit and a power supply circuit of the horn switch mechanism are connected to the airbag apparatus 20. As a result, the airbag apparatus 20 can be assembled with the steering wheel main body 1, and the steering wheel S can be mounted in the vehicle.

When an operation signal is input to the inflator 30, and the inflation gas is discharged out of the gas discharge port 30*b*, the airbag 35 inflates. The inflating airbag 35 pushes the left door portion 45 and the right door portion 50, and causes the predetermined fracture portion 55 to fracture. The left door portion 45 and the right door portion 50 are opened as illustrated by two-dotted lines in FIGS. 1 to 4. That is, the left door portion 45 and the right door portion 50 are opened, having the respective hinge portions 47 and 51 as rotation centers. The opening area 42 of the airbag cover 40 is open. For this reason, the airbag 35 protrudes through the opening area 42, and inflates until the completely inflated airbag shape supportable by the upper surface of the ring portion R is formed.

When the airbag cover 40 of the embodiment is pushed and opened by the airbag 35, the left door portion (the attaching door portion) 45 is opened in such a manner that the common portion 56, in other words, the vicinity of the attaching seat 46 is positioned farther toward the rear than in the lateral direction compared to the right door portion (the non-attaching door portion) 50. That is, the ornament 78 attached to the attaching seat 46 rotates along with the opening of the door portion 45. However, the ornament 78 rotates being offset farther to the rear than a mounting spot of the operation unit (the operation switch) 15 (15*a*) which is the spoke mounting component 13. As a result, the ornament 78 is prevented from coming into contact with the operation unit 15*a* which is the avoidance object 16, thereby preventing damage to the operation unit 15*a*.

That is, from the perspective of operability or design, the spoke mounting components 10 and 13 such as the operation unit 15, or the bezels 11 and 14 are mounted on the front left spoke portion SFL or the front right spoke portion SFR, which extends from the front edge of the boss portion B to the left and the right, respectively. When the left door portion 45 which is the attaching door portion is opened farther toward the rear than in the lateral direction, the vicinity of the attaching seat 46 is unlikely to overlap an upper surface of the front, left spoke portion SFL. For this reason, it is possible to prevent the ornament 78 from coming into contact with the avoidance object 16 (the operation unit 15) which is the spoke mounting component 13 provided on the upper surface of the front spoke portion, thereby preventing damaging the avoidance object 16.

Accordingly, in the steering wheel airbag cover 40 according to the embodiment, even when the ornament 78 is retained by either the left door portion 45 or the right door portion 50, it is possible to prevent the ornament 78 from coming into contact with the avoidance object (the operation unit 15*a*) 16 which is the spoke mounting component 13, thereby preventing damaging the avoidance object 16.

The steering wheel airbag cover 40 can also prevent damage to the ornament 78 itself. That is, the steering wheel airbag cover 40 can prevent damage to both of the avoidance object 16 and the ornament 78.

The amount of offset X of the open left door portion (the attaching door portion) 45 to the rear is determined based on a position of the attaching seat 460 (refer to FIGS. 3 and 4). The attaching seat 460 is opened in such a manner that the ornament 78 is disposed right beside the longitudinal direction. In the embodiment, the amount of offset X is defined as a longitudinal distance between the center of the open attaching seat 460 and the center of the open attaching seat 46 (the ornament 78). The amount of offset X is preferably set to be large in such a manner that the ornament 78 is satisfactorily offset from the avoidance object 16 to the rear. The avoidance object 16 may be damaged when the rotating ornament 78 comes into contact with the avoidance object 16. However, the amount of offset X may be set to be small. For example, when the ornament 78 is brought into contact with the avoidance object 16 by a pushing pressure, a magnitude of which is not large enough to damage the avoidance object 16, the amount of offset X may be set to be small. That is, it is preferred that the amount of offset X be appropriately set based on rigidity of the avoidance object 16 and the kinetic energy of the ornament 78. However, even when the amount of offset X is set to be small, it is necessary to dispose the front common portion 57 of the open attaching door portion 45 farther to the rear than front common portion 57 of the open right door portion (the non-attaching door portion) 50.

In the airbag cover 40 according to the embodiment, the predetermined fracture portion 55 includes the attaching front portion 60 of the front edge 45*a*; the attaching rear portion 63 of the rear edge 45*b*; and the common portion 56 in the circumferential edge of the left door portion 45 as the attaching door portion. Furthermore, the predetermined fracture portion 55 includes the non-attaching front portion 65 of the front edge 50*a*; the non-attaching rear portion 68 of the rear edge 50*b*; and the common portion 56 in the circumferential edge of the right door portion 50 as the non-attaching door portion. The left door portion 45 has a portion between the end portions 60*a* and 63*a* separated from the common portion 56 of the attaching front portion 60 and the attaching rear portion 63, as the attaching hinge portion 47. The right door portion 50 has a portion between the end portions 65*a* and 68*a* separated from the common portion 56 of the non-attaching front portion 65 and the non-attaching rear portion 68, as the non-attaching hinge portion 51. When seen from above, the attaching hinge portion 47 and the non-attaching hinge portion 51 have length dimensions HL and HR, respectively, which are substantially the same (HL=HR). In the predetermined fracture portion 55, the end portion 60*a* of the attaching front portion 60 includes the farthest bending end portion 61, and bends and extends farther to the rear than the end portion 65*a* of the non-attaching front portion 65. That is, the farthest bending end portion 61 includes the bending portion 61*a* which is longer than the bending portion 66 of the end portion 65*a* of the non-attaching front portion 65. Furthermore, the farthest bending end portion 61 includes the running portion 61*b* that extends to the rear from a rear end of the bending portion 61*a*. The end portion 65*a* of the non-attaching front portion 65 does not include a portion similar to the running portion 61*b*.

For this reason, in the embodiment, the end portion 60*a* of the attaching front portion 60 of the left door portion 45 extends farther to the rear than the end portion 65*a* of the non-attaching front portion 65 of the right door portion 50, and thus the left door portion 45 has a fracture distance longer than that of the right door portion 50. However, when the left door portion 45 as the attaching door portion is opened, and the right door portion 50 which is the non-attaching door portion is opened, the hinge portion 47 has the length dimension HL which is substantially the same as the length dimension HR of the hinge portion 51. For this reason, when the airbag 35 inflates, it is possible to ensure the strength of the respective hinge portions 47 and 51 of the left door portion 45 and the right door portion 50, and it is possible to stably open the left door portion 45 and the right door portion 50 to the left and the right, respectively. As a result, the left door portion 45 and the right door portion 50 can allow the smooth protrusion of the airbag 35.

Furthermore, in the embodiment, the farthest end of the attaching rear portion 63 in the predetermined fracture portion 55 is separated from the common portion 56 straightly along the lateral direction. The non-attaching rear portion 68 in the predetermined fracture portion 55 is separated from the common portion 56 straightly along the lateral direction, and the farthest end of the non-attaching rear portion 68 includes the bending portion 69 that bends to the front.

That is, in the embodiment, the left door portion 45 which is the attaching door portion is not provided with the bending portion, and the farthest end of the end portion 63*a* of the attaching rear portion 63 simply extends straight to the outside. For this reason, it is possible to dispose the hinge portion 47 in the rearmost end while ensuring a large opening area when the left door portion 45 is opened. In other words, the left door portion 45 which is the attaching door portion can reduce a period of contact between the face of the driver and the ornament 78, being one of the hinged double door portions, each of which is opened to the right or the left. It is possible to open the left door portion 45 farthest toward the rear without reducing an opening area when the left, door portion 45 is opened. For this reason, the ornament 78 rotating along with the opening of the door portion 45 is less likely to come into contact with the avoidance object 16 which, is the spoke mounting component 13, thereby preventing damage to the avoidance object 16. As a result, it is possible to prevent the ornament 78 from damaging the operation unit 15 which is the spoke mounting component 13 as the avoidance object 16. It is also possible to prevent damage to the ornament 78 itself.

In the embodiment, the hinge portion 47 of the left door portion 45 provided with the ornament 78 has the length dimension HL which is substantially the same as the length dimension HR of the hinge portion 51 of the right door portion 50. However, insofar as the strength of the hinge portion 47 can be ensured, the length dimension HL of the hinge portion 47 may be set to be shorter than the length dimension HR of the hinge portion 51 of the right door portion 50. Even at this time, it is also necessary to open the left door portion 45 farther to the rear than in the lateral direction. The reason is because the open ornament 78 is required to come into contact with the avoidance object 16 or the vicinity of the avoidance object 16 without damaging the avoidance object 16. It is possible to ensure the strength of the hinge portion 47, by increasing the thickness of the hinge portion 47, or providing a reinforcement member in the hinge portion 47.

When the hinge portion 47 is set to have a length shorter than that of the hinge portion 51, the end portion 63*a* of the attaching rear portion 63 of the predetermined fracture portion 55 may be provided with the bending portion that bends to the front along the inside of the rear edge portion 73*b* of the left wall portion 73.

Furthermore, when the end portion 63*a* of the attaching rear portion 63 is provided with the bending portion that bends to the front as described above, the end portion 60*a* of the attaching front portion 60 may set the running portion 61*b* to be shorter than in the embodiment, or may not include the running portion 61*b*. Furthermore, insofar as the left door portion 45 is opened farther toward the rear than in the lateral direction, without damaging the avoidance object 16 or the ornament 78, the left door portion 45 may be provided with only the bending portion 61*a* formed along the inside of the front edge portion 74*a* without the running portion 61*b*. Alternatively, when the running portion 61*b* is not provided, the length dimension LL of the bending portion 61*a* may be reduced while the length dimension LL is maintained to be longer than the length dimension LS of the bending portion 66.

In the embodiment, the left, door portion 45 is provided with the ornament 78. However, in the airbag cover, the right door portion 50 may be provided with the ornament 78, which is bilaterally symmetrical with respect to the embodiment.

Furthermore, in the embodiment, the airbag cover is provided with the hinged double door portions which are formed of the left door portion and the right door portion. However, a three door airbag cover or a four door airbag cover may be adopted. For example, as illustrated in FIG. 8, the three door airbag cover is configured to also include a forward opening front door portion 44 provided on a front side of the left door portion 45 or the right door portion 50. The three door airbag cover is configured to also include a rearward opening rear door portion provided on a rear side of the left door portion 45 or the right door portion 50. For example, the four door airbag cover is configured to include the left door portion 45 and the right door portion 50 in addition to the above-mentioned front and rear door portions.

What is claimed is:

1. A steering wheel airbag cover that is used in a steering wheel having a boss portion provided in the vicinity of the center of the steering wheel, and accommodating an airbag in the boss portion, and that is provided on an upper surface of the boss portion, the airbag cover comprising:
    a ceiling wall portion that covers the airbag;
    right and left door portions which are provided in the ceiling wall portion, and each of which is opened to the right and to the left, respectively, when the airbag inflates;
    an attaching seat that is provided in any one of the right and left door portions in the vicinity of the center of the ceiling wall portion;
    an ornament that is retained on the attaching seat, and is provided on an upper surface in the vicinity of the center of the ceiling wall portion; and
    a predetermined fracture portion
        that is provided in the ceiling wall portion, and fractures when the airbag inflates,
        that is disposed in a front edge, a rear edge, and a center edge approaching the front and rear edges of a circumferential edge of each of the right and left door portions,
        that has the center edge between the right and left door portions as a common portion, and
        in which the common portion includes a bypass portion which goes around half of the circumference of the attaching seat,
    wherein one of the right and left door portions, retaining the ornament, becomes an attaching door portion, and the other of the right and left door portions, to which the ornament is not attached, becomes a non-attaching door portion, and
    wherein when seen from above, the attaching door portion is opened, in such a manner that the common portion of the attaching door portion is positioned farther toward the rear compared to the non-attaching door portion.

2. The steering wheel airbag cover according to claim 1,
    wherein the predetermined fracture portion includes an attaching front portion of the front edge, an attaching rear portion of the rear edge, and the common portion in a circumferential edge of the attaching door portion,
    wherein the predetermined fracture portion includes a non-attaching front portion of the front edge, a non-attaching rear portion of the rear edge, and the common portion in a circumferential edge of the non-attaching door portion,
    wherein the attaching door portion has a portion between end portions separated from the common portion of the attaching front portion and the attaching rear portion provided as an attaching hinge portion when the door portions are opened,
    wherein the non-attaching door portion has a portion between end portions separated from the common portion of the non-attaching front portion and the non-attaching rear portion provided as a non-attaching hinge portion when the door portions are opened,
    wherein when seen from above, the attaching hinge portion has substantially the same length dimension as that of the non-attaching hinge portion, and
    wherein in the predetermined fracture portion, the end portion separated from the common portion of the attaching front portion bends and extends farther to the rear than the end portion separated from the common portion of the non-attaching front portion.

3. The steering wheel airbag cover according to claim 2,
    wherein a farthest end of the attaching rear portion in the predetermined fracture portion is separated straightly from the common portion, and
    wherein the non-attaching rear portion in the predetermined fracture portion extends straightly from the common portion, and has a bending portion, a farthest end of which bends to the front.

* * * * *